United States Patent
Min

(10) Patent No.: US 9,539,936 B2
(45) Date of Patent: Jan. 10, 2017

(54) AUTOMOBILE LAMP HAVING FLOATING LIGHTING IMAGE

(71) Applicant: HYUNDAI MOBIS CO., LTD., Seoul (KR)

(72) Inventor: Young Ki Min, Yongin (KR)

(73) Assignee: HYUNDAI MOBIS CO., LTD., Seoul (KR)

(\*) Notice: Subject to any disclaimer, the term of this patent is extended or adjusted under 35 U.S.C. 154(b) by 269 days.

(21) Appl. No.: 14/521,355

(22) Filed: Oct. 22, 2014

(65) Prior Publication Data
US 2016/0059769 A1 Mar. 3, 2016

(30) Foreign Application Priority Data
Sep. 2, 2014 (KR) .......................... 10-2014-0116447

(51) Int. Cl.
*B60Q 1/24* (2006.01)
*F21S 8/10* (2006.01)

(52) U.S. Cl.
CPC ............... *B60Q 1/24* (2013.01); *F21S 48/215* (2013.01); *F21S 48/2212* (2013.01); *F21S 48/24* (2013.01)

(58) Field of Classification Search
CPC ............ B60Q 1/26; B60Q 5/00; F21S 48/215; F21S 48/22; F21S 48/25; F21S 48/2212; F21S 48/24

USPC .......................................................... 362/545
See application file for complete search history.

(56) References Cited

U.S. PATENT DOCUMENTS

| | | | | | |
|---|---|---|---|---|---|
| 3,401,596 | A | * | 9/1968 | Hirsch ....................... | F21L 4/00 353/43 |
| 4,977,695 | A | * | 12/1990 | Armbruster ........... | B60R 13/005 40/541 |
| 5,625,968 | A | * | 5/1997 | Ashall .................. | G02B 6/0043 362/604 |
| 5,939,979 | A | * | 8/1999 | Lee .......................... | B60Q 1/26 340/468 |
| 6,224,244 | B1 | * | 5/2001 | Burys ....................... | B60N 3/14 362/23.18 |
| 7,147,345 | B1 | * | 12/2006 | Toney, Jr. ................. | F21L 4/00 362/208 |
| 2003/0030777 | A1 | * | 2/2003 | Sekiguchi .............. | G03B 21/14 353/79 |

FOREIGN PATENT DOCUMENTS

| | | |
|---|---|---|
| JP | 2011-198720 A | 10/2011 |
| JP | 2012-508393 A | 4/2012 |
| KR | 10-2009-0060067 A | 6/2009 |
| KR | 10-2013-0122394 A | 11/2013 |

\* cited by examiner

*Primary Examiner* — Ali Alavi

(57) ABSTRACT

The present invention provides an automobile lamp having a floating lighting image, including: a light pattern which is configured by an assembly of light sources; a lens which is provided with an interval from the light pattern; and an image object which is provided between the light pattern and the lens.

7 Claims, 1 Drawing Sheet

AUTOMOBILE LAMP HAVING FLOATING LIGHTING IMAGE

CROSS-REFERENCE TO RELATED APPLICATIONS

This application claims priority to and the benefit of Korean Patent Application No. 10-2014-0116447 filed in the Korean Intellectual Property Office on Sep. 2, 2014, the entire contents of which are incorporated herein by reference.

TECHNICAL FIELD

The present invention relates to an automobile lamp having a floating lighting image which implements a lighting image to be floated outside a lamp skin.

BACKGROUND ART

Generally, a lighting system is provided in a vehicle as means for lighting during nighttime driving and means for various signals during driving. Among the lighting system which is provided for the above-mentioned purpose, a rear lamp which is provided at both corners of a rear side of the vehicle is a component which includes brake lights, tail lights, and turn signals and used to notify to a driver of other vehicle which follows the own vehicle, of a driving intention and a state of the vehicle. Generally, a rear lamp includes a lamp housing which configures an overall rear framework, a reflector which is attached to a front side of the lamp housing to reflect light, a light source which is mounted on a front surface of the reflector, and a lens which is provided in front of the light source and the reflector. A technical trend of the automobile lamp is developed from a point type light source to a linear type light source, from a linear type light source to a surface emission type, and from a surface mission type to a light source of a stereoscopic lighting image. However, an automobile lamp which may implement a stereoscopic lighting image on an outer side of a lamp skin has not been developed.

In the meantime, as an example of a related technology of a 3D lighting image, Korean Unexamined Patent Application Publication No. 10-2009-0060067 discloses "a diffuser plate and a backlight unit for a liquid display device including the same"

SUMMARY OF THE INVENTION

The present invention has been made in an effort to provide an automobile lamp having a floating lighting image which implements a lighting image to be floated outside a lamp skin.

The present invention may provide an automobile lamp having a floating lighting image, including: a light pattern which is configured by an assembly of light sources; a lens which is provided with an interval from the light pattern; and an image object which is provided between the light pattern and the lens.

The light source may be an LED.

The light pattern, the image object, and the lens may be arranged in one line.

The light pattern and the image object may be disposed so as to be perpendicular to the lens and a concave mirror is provided at a point between the image object and the lens where perpendicular arrangement lines formed by the image object and the lens meet.

The lens may be configured by a single lens.

The lens may be configured by arranging a plurality of lenses in one line with an interval.

The lens may be a diffractive optical element lens or a Fresnel lens.

According to the automobile lamp having a floating lighting image may be implemented so as to float the lighting image outside a lamp skin.

Further, the stereoscopic lighting image is implemented so that the lighting feeling is improved and a viewing angle may be secured.

DETAILED DESCRIPTION OF THE INVENTION

Figure 1:
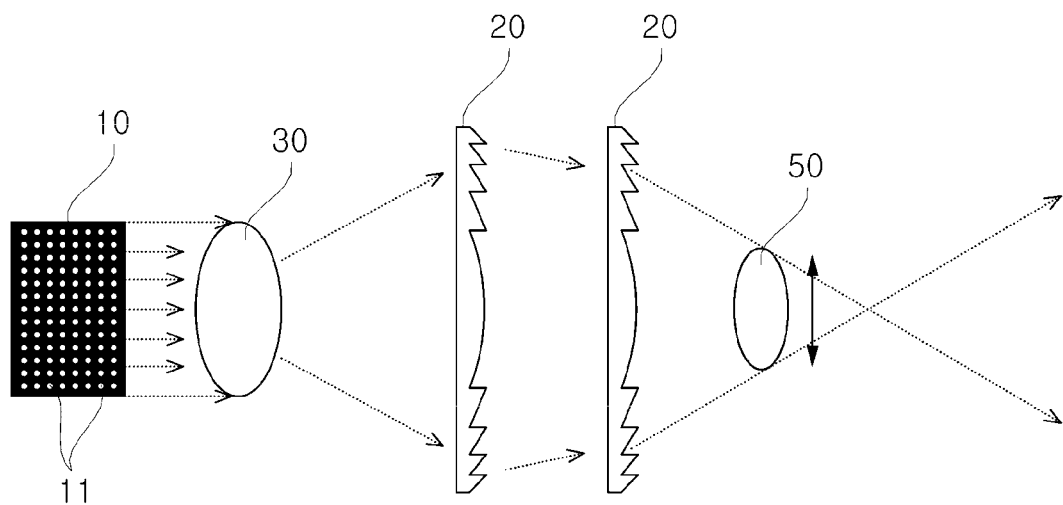
FIG. 1 is a diagram of an automobile lamp having a floating lighting image according to a first exemplary embodiment of the present invention.

Hereinafter, exemplary embodiments of the present invention will be described in detail with reference to the accompanying drawings. In the figures, it should be noted that even though the parts are illustrated in different drawings, it should be understood that like reference numerals refer to like parts of the present invention throughout the several figures of the drawing. Furthermore, hereinafter, exemplary embodiments of the present invention will be described. However, it should be understood that the technical spirit of the invention is not limited to the specific embodiments, but may be changed or modified in various ways by those skilled in the art.

Figure 2:
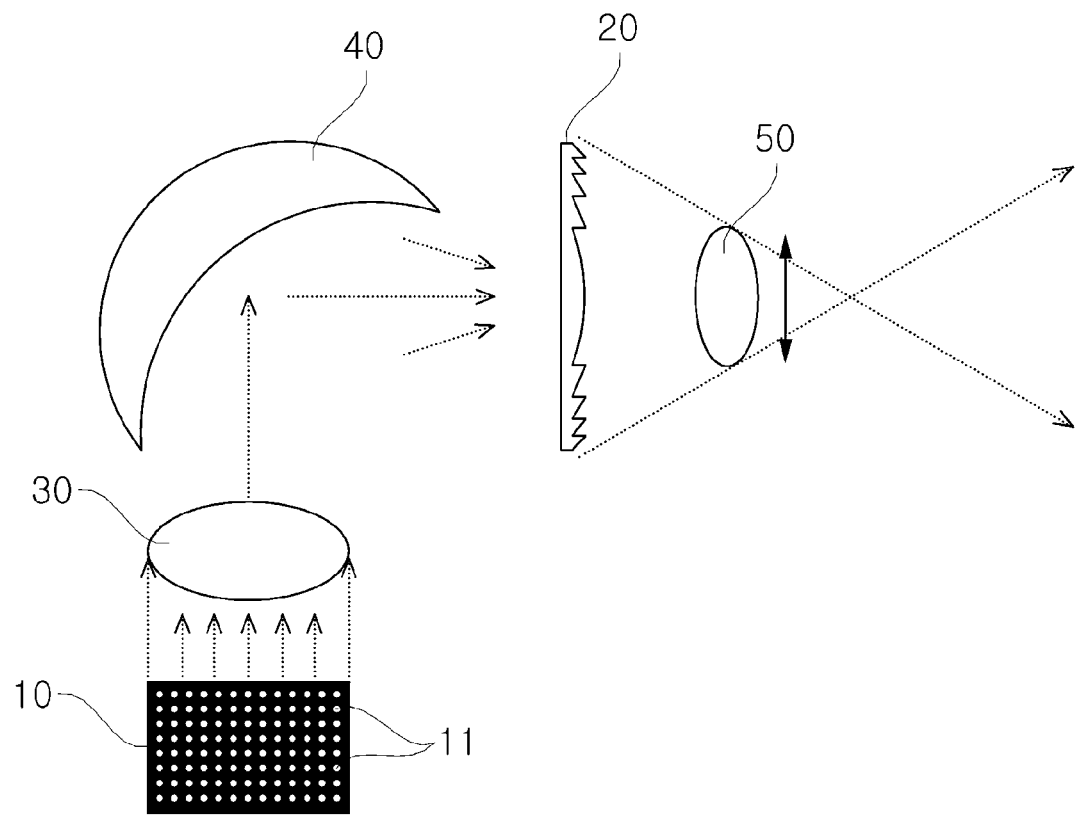
FIG. 2 is a diagram of an automobile lamp having a floating lighting image according to a second exemplary embodiment of the present invention.

FIG. 1 is a diagram of an automobile lamp having a floating lighting image according to a first exemplary embodiment of the present invention and FIG. 2 is a diagram of an automobile lamp having a floating lighting image according to a second exemplary embodiment of the present invention.

An automobile lamp having a floating lighting image according to an exemplary embodiment of the present invention stereoscopically represents a lighting image outside a lamp skin using two or more of Fresnel lenses and a concave mirror to provide a lighting image which is differentiated from the automobile lamp of the related art.

First, a configuration of the first exemplary embodiment of the present invention will be described.

Referring to FIG. 1, the first exemplary embodiment of the present invention includes a light pattern 10 which is configured by an assembly of light sources, a lens 20 which is provided with a predetermined interval from the pattern 10, and an image object 30 which is disposed between the light pattern 10 and the lens 20. The light pattern 10, the image object 30, and the lens 20 are provided in one line in this order.

Specifically, the light pattern 10 is an assembly formed by a combination of light sources 11. The light sources 11 for the light pattern may be arranged in various patterns such as a lattice pattern, a circular pattern, a dot pattern, a line pattern, and a surface pattern. The light sources 11 may be regularly or irregularly arranged.

Even though a display light source may be used for the light source 11, an LED light source is desirably used in order to satisfy regulations on light distribution. The LED (light emitting diode) is a semiconductor element which flows current into a compound such as gallium arsenide to emit light. The semiconductor element injects minority carriers (electron or hole) using a p-n junction structure of an m semiconductor and recombines the carriers to emit light. The LED is required to generate tiny light which is flickering when a hard disk turns in a main body of a computer, a large size electronic display which is provided on a building of a downtown, invisible ray which is generated when a signal is transmitted to a main body of a TV by pressing a remote controller. The LED has a high efficiency for converting electric energy into light energy so that energy may be saved up to 90%. Therefore, the LED attracts an attention as a next generation light source which may be substituted for an incandescent lamp or a fluorescent light whose energy efficiency is just 5%. The LED is configured with a structure in which when current passes through a conductive material with electrodes attached thereon and therebelow, plus charge particles which are called an electron and a hole are combined at a center of the electrodes to emit a photon of light. A color of the light may vary depending on a property of the material.

The lens 20 is provided with a predetermined interval with the light pattern 10. The lens 20 may be configured such that one or two or more lenses are arranged with a predetermined interval. The lens 20 may be a diffractive optical element lens. The lens 20 may be a Fresnel lens.

The Fresnel lens is a lens obtained by dividing lens into several annular sections in order to reduce a thickness of the lens. Therefore, a lens having a large lens aperture may be provided without increasing the thickness of the lens. As a lens which emits light as parallel rays, the Fresnel lens is used as a collecting lens on a finder of a reflex camera or a surface to be projected of a projector in recent years. Further, the Fresnel lens is used for an overhead projector (OHP) and also used for tail lights of a vehicle.

The image object 30 is disposed between the light pattern 10 and the lens 20. The image object 30 is provided between the light pattern 10 and the lens 20 to implement the lighting image outside the lamp skin of the vehicle. The image object 30 needs to be smaller than the light pattern 10 and the lens 20. The image object 30 may have various shapes which are harmonized with the vehicle, such as a logo, a symbol, or a character. For example, when a logo of a car manufacturer is used as the image object 30, a promotional effect of the car manufacturer may be naturally expected.

Next, a configuration of the second exemplary embodiment of the present invention will be described.

As described in FIG. 2, configurations of a light pattern 10, an image object 30, and a lens 20 according to the second exemplary embodiment of the present invention are the same as those of the first exemplary embodiment. However, the light pattern 10 and the image object 30 are arranged so as to be perpendicular to the lens 20, which is different from the first exemplary embodiment.

Specifically, the light pattern 10 and the image object 30 are disposed so as to form one line. For example, as illustrated in FIG. 2, the light pattern 10 and the image object 30 are vertically disposed in one line and the lens 20 may be horizontally disposed so as to be perpendicular to the light pattern 10 and the image object 30.

In the meantime, a concave lens 40 may be disposed at a point where the perpendicular arrangement lines formed by the image object 30 and the lens 20 meet. The concave lens 40 reflects the light of the light pattern 10 toward the lens 20 which is disposed to be perpendicular to the light pattern 10.

A concave mirror is a spherical mirror having a concave reflective surface and collects light. A focal point of the concave mirror is an actual focal point and an upright image and an inverted image are formed in accordance with a position of an object. That is, a property of the image varies in accordance with the position of the object with respect to the focal point and a center of curvature. When an object is disposed to be closer to the mirror than the focal point, a magnified upright virtual image (an upright virtual image) is represented. When the object is disposed between the focal point and the center of the curvature, a magnified actual image (inverted actual image) which inversely uprights is represented. When the object moves away from the center of curvature, a reduced inverted actual image is represented. When the object is located at the focal point, no image is formed. When the object is disposed from an infinitely distance from a mirror surface, an image is formed as one point at the focal point. The concave mirror has a light collecting property so as to be used to collect the light to propagate the light far away or concentrate the light energy. A head light, a lamp house, or a screen painter may use the concave mirror.

The second exemplary embodiment of the present invention has a different arrangement structure from the first exemplary embodiment, which is appropriate for a lamp having a lamp structure which is not provided in one line or a perpendicular internal structure.

Next, a lighting image implement process of the first exemplary embodiment of the present invention will be described.

In the first exemplary embodiment of the present invention, an image of the image object 30, as illustrated in FIG. 1, sequentially passes through a plurality of Fresnel lenses by light emitted through the light pattern 10 which is formed by an assembly of the LED light source 11 to be implemented as a lighting image 50 outside the lamp skin.

In this case, the Fresnel lens 20 has a small thickness and a large lens aperture so that even though a plurality of Fresnel lenses 20 is provided, the Fresnel lens does not occupy so much an installation space in the lamp.

The lighting image 50 which is implemented outside the lamp skin has a size which is smaller than a size of an actual image object 30 while passing through the plurality of Fresnel lenses 20.

As described above, according to the first exemplary embodiment of the present invention, the light pattern 10, the image object 30, and the lens 20 are disposed in one line to implement a stereoscopic lighting image, thereby representing so that an image which is differentiated from that of the lamp of the related art, improving a lighting feeling, and securing a viewing angle.

Next, a lighting image implement process of the second exemplary embodiment of the present invention will be described.

According to the second exemplary embodiment of the present invention, as illustrated in FIG. 2, an image of the image object 30 is reflected onto the concave mirror 40 by light which is emitted from the light pattern 10 configured by an assembly of LED light sources 11 to be directed to the Fresnel lens 20. The image of the image object 30 which passes through the Fresnel lens 20 is implemented as a lighting image 50 outside the lamp skin.

Even though one Fresnel lens 20 is illustrated in FIG. 2, the present invention is not limited thereto and a plurality of Fresnel lens 20 may be provided as described in the first exemplary embodiment.

The lighting image 50 which is implemented outside the lamp skin has a size which is smaller than a size of an actual image object 30 while passing through the Fresnel lens 20.

As described above, according to the second exemplary embodiment of the present invention, the light pattern 10 and the image object 30 are disposed so as to be perpendicular to the lens 20 and the concave mirror 40 is provided at a point where perpendicular arrangement lines of the image object 30 and the lens 20 meet to implement a stereoscopic lighting image 50, thereby representing an image which is differentiated from that of the lamp of the related art, improving a lighting feeling, and securing a viewing angle.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the protection scope of the present invention.

What is claimed is:

1. An automobile lamp having a floating lighting image, comprising:
   a light pattern which is configured by an assembly of light sources;
   a lens which is provided with an interval from the light pattern; and
   an image object which is provided between the light pattern and the lens.

2. The optical structure of claim 1, wherein the light source is an LED.

3. The optical structure of claim 1, wherein the light pattern, the image object, and the lens are arranged in one line.

4. The optical structure of claim 1, wherein the light pattern and the image object are disposed so as to be perpendicular to the lens and a concave mirror is provided at a point between the image object and the lens where perpendicular arrangement lines formed by the image object and the lens meet.

5. The optical structure of claim 1, wherein the lens is configured by a single lens.

6. The optical structure of claim 1, wherein the lens is configured by arranging a plurality of lenses in one line with an interval.

7. The optical structure of claim 1, wherein the lens is a diffractive optical element lens or a Fresnel lens.

* * * * *